United States Patent
Merino Vazquez et al.

(10) Patent No.: US 9,578,068 B2
(45) Date of Patent: Feb. 21, 2017

(54) METHODS AND APPARATUS FOR PROCESSING AN IMS SESSION

(71) Applicant: Telefonaktiebolaget L M Ericsson (publ), Stockholm (SE)

(72) Inventors: Emiliano Merino Vazquez, Madrid (ES); Tobias Austrell, Älvsjö (SE); Juan Manuel Fernandez Galmes, Madrid (ES); Bernardo Perez De Villar Caamaño, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 14/429,566

(22) PCT Filed: Sep. 24, 2012

(86) PCT No.: PCT/EP2012/068741
§ 371 (c)(1),
(2) Date: Mar. 19, 2015

(87) PCT Pub. No.: WO2014/044327
PCT Pub. Date: Mar. 27, 2014

(65) Prior Publication Data
US 2015/0249690 A1    Sep. 3, 2015

(51) Int. Cl.
*H04W 4/00* (2009.01)
*H04L 29/06* (2006.01)
(Continued)

(52) U.S. Cl.
CPC ....... *H04L 65/1016* (2013.01); *H04L 65/1073* (2013.01); *H04L 65/80* (2013.01);
(Continued)

(58) Field of Classification Search
None
See application file for complete search history.

(56) References Cited

U.S. PATENT DOCUMENTS

| 9,191,910 B2* | 11/2015 | Shi | H04W 60/005 370/328 |
| 2010/0039930 A1* | 2/2010 | Liang | H04L 69/40 370/216 |

(Continued)

FOREIGN PATENT DOCUMENTS

| EP | 2 075 956 A1 | 7/2009 |
| EP | 2 234 364 A1 | 9/2010 |

OTHER PUBLICATIONS

3GPP TS 23.380 V10.1.0 (Jun. 2011) 3rd Generation Partnership Project; Technical Specification Group Core Network and Terminals; IMS Restoration Procedures (Release 10) Jun. 7, 2011 consisting of 16-pages.
(Continued)

*Primary Examiner* — Anh-Vu Ly
(74) *Attorney, Agent, or Firm* — Christopher & Weisberg, P.A.

(57) ABSTRACT

There is provided a method of processing an IMS session originated by a UE after restart of a S-CSCF that was previously assigned to a user of the UE during registration with the IMS, when a further S-CSCF is currently assigned to the user. The method comprises, at a HSS, receiving a request to register a user identity of the user from the previously assigned S-CSCF, determining that the previously assigned S-CSCF is not the same as a S-CSCF currently assigned to the user, determining if IMS restoration procedures are supported for the UE, and, if IMS restoration procedures are not supported for the UE, sending a response to the previously assigned S-CSCF, the response identifying the further S-CSCF currently assigned to the user.

19 Claims, 4 Drawing Sheets

(51) Int. Cl.
  *H04L 29/14* (2006.01)
  *H04W 8/04* (2009.01)
  *H04W 60/00* (2009.01)
  *H04W 76/02* (2009.01)
  *H04W 88/06* (2009.01)
(52) U.S. Cl.
  CPC ............... *H04L 69/40* (2013.01); *H04W 8/04* (2013.01); *H04W 60/00* (2013.01); *H04W 76/021* (2013.01); *H04W 88/06* (2013.01)

(56) References Cited

U.S. PATENT DOCUMENTS

| | | | | |
|---|---|---|---|---|
| 2010/0177767 | A1* | 7/2010 | Ishii | H04W 8/04 370/352 |
| 2010/0257272 | A1* | 10/2010 | Belinchon Vergara | H04L 29/06027 709/227 |
| 2011/0213896 | A1* | 9/2011 | Merino Vazquez | H04L 29/12188 709/245 |
| 2011/0275372 | A1* | 11/2011 | Shi | H04L 65/1016 455/435.1 |
| 2012/0131167 | A1* | 5/2012 | Shen | H04L 65/1016 709/223 |
| 2014/0092853 | A1* | 4/2014 | Noldus | H04L 65/1016 370/329 |
| 2015/0124588 | A1* | 5/2015 | Hallenstal | H04L 65/1016 370/221 |

OTHER PUBLICATIONS

3GPP TS 23.002 V11.2.0 (Mar. 2012) 3rd Generation Partnership Project; Technical Specification Group Services and System Aspects; Network architecture (Release 11) Mar. 8, 2012 consisting of 96-pages.
3GPP TS 23.228 V11.4.0 (Mar. 2012) 3rd Generation Partnership Project; Technical Specification Group Services and System Aspects; IP Multimedia Subsystem (IMS); Stage 2 (Release 11) Mar. 8, 2012 consisting of 287-pages.
3GPP TS 24.229 V11.3.0 (Mar. 2012) 3rd Generation Partnership Project; Technical Specification Group Core Network and Terminals; IP multimedia call control protocol based on Session Initiation Protocol (SIP) and Session Description Protocol (SDP); Stage 3 (Release 11) Mar. 13, 2012 contains 728-pages.
3GPP TS 29.228 V11.3.0 (Mar. 2012) 3rd Generation Partnership Project; Technical Specification Group Core Network and Terminals; IP Multimedia (IM) Subsystem Cx and Dx interfaces; Signalling flows and message contents (Release 11) Mar. 21, 2012 72-pages.
International Search Report and Written Opinion dated Apr. 25, 2013 for International Application Serial No. PCT/EP2012/068741, International Filing Date—Sep. 24, 2012 consisting of 9-pages.

* cited by examiner

METHODS AND APPARATUS FOR PROCESSING AN IMS SESSION

TECHNICAL FIELD

The present invention relates to methods and apparatus for processing an IP Multimedia Subsystem (IMS) session. More particularly, the invention relates to methods and apparatus for processing an IMS session originated by a User Equipment (UE) after restart of a Serving Call Session Control Function (S-CSCF).

BACKGROUND

The IP Multimedia Subsystem (IMS) is the technology defined by the Third Generation Partnership Project (3GPP) to provide IP Multimedia services over telecommunication networks. The IMS allows a telecommunications system to offer multimedia services to user terminals (referred hereinafter as "user equipment" (UE)). For example, these services can comprise voice, video, text, chat, and combinations thereof. To do so, IMS provides key features to enrich the end-user person-to-person communication experience through the integration and interaction of services. IMS allows new rich person-to-person (client-to-client) as well as person-to-content (client-to-server) communications over an IP-based network. The IMS is able to connect to both PSTN/ISDN (Public Switched Telephone Network/Integrated Services Digital Network) as well as the Internet. In relation to an IMS, a UE may be any device, mobile or stationary, enabled to communicate by radio or any other means with the IMS via an IP-CAN, for instance but not limited to e.g. mobile phone, smart phone, sensors, meters, vehicles, household appliances, medical appliances, media players, cameras, or any type of consumer electronic device, for instance but not limited to television, radio, lighting arrangements, tablet computer, laptop, or PC.

The IMS makes use of the Session Initiation Protocol (SIP) to set up and control calls or sessions between UEs (or UEs and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Figure 1:
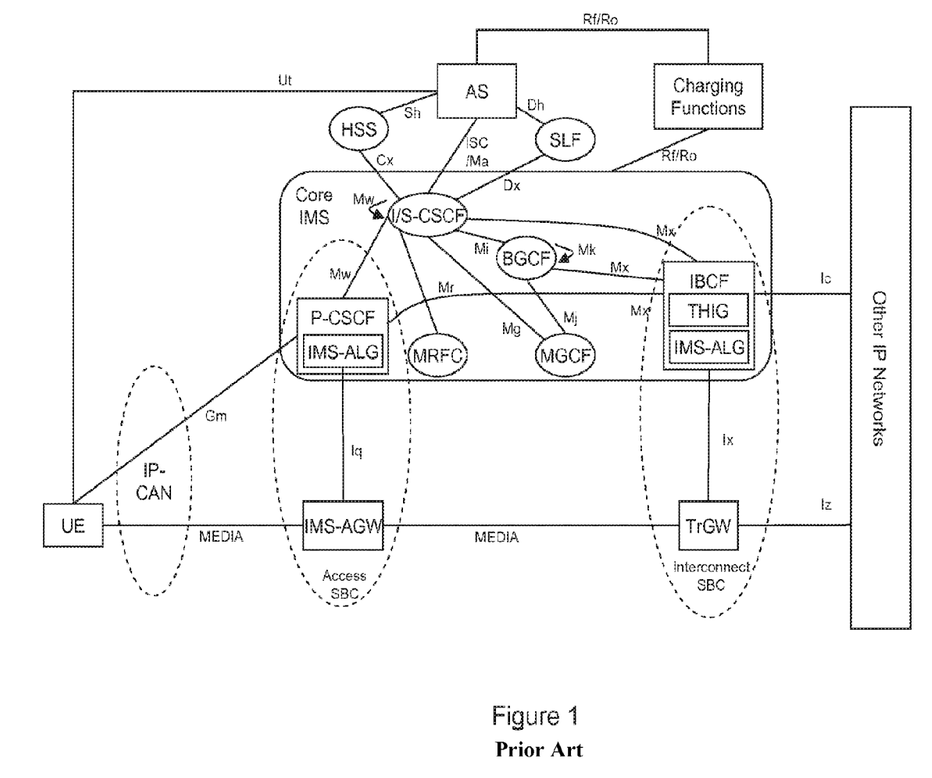
FIG. 1 illustrates schematically the architecture of an IMS and its relationship to an IP-Connectivity Access Network.

FIG. 1 illustrates schematically the architecture for the IMS and its relationship to an IP-Connectivity Access Network (IP-CAN). In the IMS Core Network, Call/Session Control Functions (CSCFs) operate as SIP proxies, and interface with other entities such as Border Gateway Control Functions (BGCFs) and Media Resource Function Controllers (MRFCs) amongst others. The 3GPP architecture defines three types of CSCFs, and there can be multiple instances of each type of CSCF within an operator's network. A Proxy CSCF (P-CSCF) is the first point of contact within the IMS for a UE; a Serving CSCF (S-CSCF) provides services to the subscriber; an Interrogating CSCF (I-CSCF) identifies the correct S-CSCF and forwards to that S-CSCF a request received from a UE via a P-CSCF.

The Home Subscriber Server (HSS) is the main database in the IMS for storage of subscriber and service related data, including user identities, registration information, access parameters and the Initial Filter Criteria (IFC) used to trigger services. For example, the HSS provides support to the IMS nodes/functional entities implementing call and/or session functionalities in order to complete the routing/roaming procedures by solving authentication, authorization, naming/addressing resolution, location dependencies, etc. The HSS also contains functionality of a Home Location Register and Authentication Centre (HLR/AUC) to provide support to packet-switched domain entities, such as the Serving GPRS Support Node (SGSN) and Gateway GPRS Support Node (GGSN), and to circuit switched domain entities, such as the Mobile Switching Centres (MSC).

Within the service layer of the IMS network, Application Servers (ASs) are provided for implementing IMS service functionality. Application Servers provide services to end users in an IMS system, and may be connected either as end-points over the 3GPP defined Ma interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

Although the network nodes in the IMS Core Network should have a very high availability, some maintenance downtime and occasional failures are unavoidable. In addition, the communication links between the network elements are also subject to failures. For this reason 3GPP TS 23.380 specifies a set of standardized procedures for automatic restoration after loss or corruption of data, including restoration procedures for scenarios in which an S-CSCF, which was successfully assigned to serve a UE during registration of the UE, fails to process further signalling relating to a service for said UE. In particular, section 4.4.2 of 3GPP TS 23.380 describes a first scenario in relation to a session originating at the UE in which the S-CSCF that was assigned to serve the UE after the successful registration of the UE has lost all the user related data to the UE or it is unable to trust the store data (e.g. due to a restart). Section 4.4.3 of 3GPP TS 23.380 then describes a second scenario in relation to a session originating at the UE in which the S-CSCF that was assigned to serve the UE after its successful registration becomes unreachable (e.g. due to internal error, or due a communication error).

Figure 2:
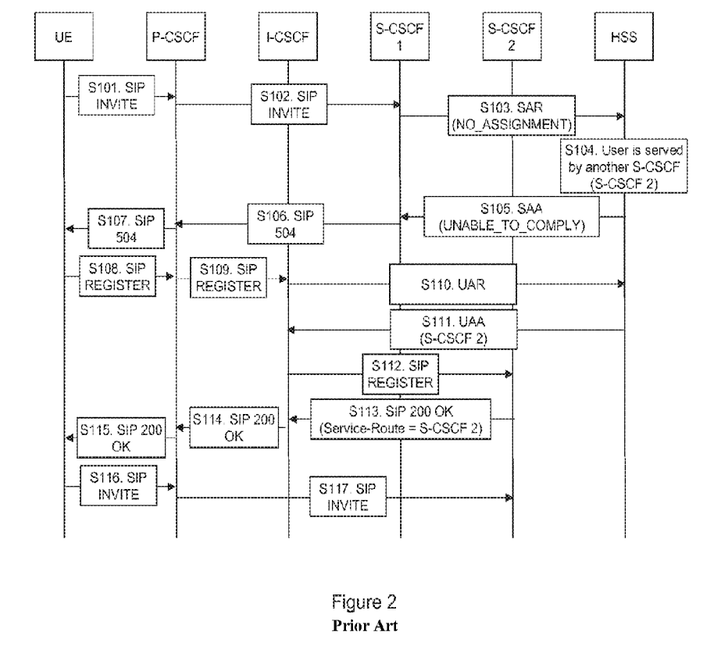
FIG. 2 is a signalling flow diagram illustrating an example of an implementation of a conventional IMS restoration procedure.

By way of example, FIG. 2 is a signalling flow diagram illustrating an example of an implementation of the restoration procedures defined in section 4.4.2 of 3GPP TS 23.380 relating to the scenario in which an S-CSCF has lost all the data related to the user. The steps performed are as follows:

S101. The (originating) UE sends a SIP INVITE message to the P-CSCF that is serving the user in order to request establishment of an IMS session.

S102. The serving P-CSCF receives the SIP INVITE, and forwards the SIP INVITE message to S-CSCF 1, which was assigned to the UE during registration. In this regard, the P-CSCF will have learnt the identity of S-CSCF 1 from the Service-Route header fields received during the registration procedure.

S103. S-CSCF 1 receives the SIP INVITE. However, as S-CSCF 1 has lost all the data related to the UE, S-CSCF 1 attempts to obtain the user profile from the HSS. To do so, S-CSCF 1 sends a Diameter Server-Assignment-Request (SAR) message to the HSS with the Server Assignment Type set to NO_ASSIGNMENT, in order to register a user identity of the user.

S104. The HSS receives the SAR message, and checks whether the S-CSCF requesting the user profile is assigned for the user. In this example, the HSS determines S-CSCF 1 is no longer assigned to the user, as another S-CSCF (S-CSCF 2) has been subsequently been assigned to the user (i.e. as S-CSCF 2 has been assigned to the user as a result of a terminating session that occurred after the failure of S-CSCF 1).

S105. The HSS therefore responds to the SAR message by sending a Diameter Server-Assignment-Answer (SAA) message to S-CSCF 1 with the Result-Code set to DIAMETER_UNABLE_TO_COMPLY, thereby indicating that the request has been unsuccessful for unspecified reasons.

S106. S-CSCF 1 receives the SAA message from the HSS and, as a result, returns a SIP 504 message in response to the SIP INVITE.

S107. S-CSCF 1 routes the SIP 504 message back to the UE via the serving P-CSCF.

S108. The UE receives the SIP 504 message and, as a result, the UE initiates a new initial registration to the IMS by sending a SIP REGISTER message.

S109. The serving P-CSCF receives the SIP REGISTER message and forwards the SIP REGISTER message to a I-CSCF.

S110. The I-CSCF receives the SIP REGISTER message and therefore sends a Diameter User-Authorization-Request (UAR) message to the HSS.

S111. The HSS receives the UAR message, and responds with a Diameter User-Authorization-Answer (UAA) message including the identity of the S-CSCF currently assigned to the user (i.e. S-CSCF 2).

S112. The I-CSCF receives the UAA message including the identity of S-CSCF 2 then forwards the SIP REGISTER message to S-CSCF 2.

S113. S-CSCF 2 receives the SIP REGISTER message, and responds with a SIP 200 OK message that includes the identity of S-CSCF 2 in the Service-Route header fields.

S114. The I-CSCF routes the SIP 200 OK message (including the Service-Route) back to the UE via the serving P-CSCF.

S115. The serving P-CSCF receives the SIP 200 OK message, saves the list of service route values in the Service-Route header fields, and forwards the 200 OK message to the UE.

S116. The UE then re-sends the SIP INVITE message in order to request establishment of the IMS session.

S117. The serving P-CSCF receives the SIP INVITE, and forwards the SIP INVITE message to S-CSCF 2, which is the S-CSCF identified in the list of service route values obtained from the Service-Route header fields of the SIP 200 OK response received in step S115.

According to 3GPP TS 23.380 (e.g. chapters 4.4.2 and 4.4.3), both of these scenarios can require that an S-CSCF returns an error response to the UE (i.e. using a SIP 504 response) in order to trigger the UE to initiate a new registration with the IMS. In this regard, 3GPP TS 24.229 (section 5.1.2A.1.6) and 3GPP TS 29.228 (section 6.1.2.1) specify, respectively, the SIP error code to be supported by these UEs (i.e. SIP message with error code "504", received by a UE from a P-CSCF), and the DIAMETER protocol error code to be supported by the S-CSCFs (i.e. DIAMETER protocol error code "DIAMETER_UNABLE_TO_COMPLY", received from a S-CSCF from a HSS, and which causes it to send a SIP message with error code "504" towards the P-CSCF, which is then to be forwarded towards the UE).

In short, the conventional restoration procedures disclosed by the 3GPP specifications require that, when the S-CSCF assigned to a user during registration with the IMS cannot process an IMS session for the user (e.g. because the S-CSCF has lost all user data following a failure or it is unable to trust any data after it resumes operation—as is the case illustrated in FIG. 2, chapter 4.4.2 of 3GPP TS 23.380-, or because the S-CSCF does not respond—e.g. chapter 4.4.3 of 3GPP TS 23.380), the UE must initiate a new registration with the IMS, such that a S-CSCF will be reassigned to the user (which can be the same assigned for its earlier registration, or a new one).

These restoration procedures therefore assume that the UE is able to receive and process a SIP 504 message received in response to a session establishment request, and that the processing of the SIP 504 message by the UE will result in the UE initiating a new registration with the IMS. However, this will not always be possible. In particular, it may not be possible for SIP signalling to transparently reach the UE, and/or the UE may not be SIP-capable. For example, the UE could be a circuit-switched UE that connects to the IMS via Mobile Softswitches (MSS), or even if the UE is SIP-capable, the UE may be connected to the IMS via Session Border Controllers (SBCs) that do not allow full transparent SIP signalling and that therefore might prevent a SIP 504 message from reaching the UE. In addition, even if the SIP signalling can reach the UE and the UE is SIP capable, the UE may not be configured to interpret a SIP 504 message as requiring the UE to initiate a new registration with the IMS. It would therefore be desirable to provide an alternative mechanism that for implementing IMS restoration that does not require the support of the UE.

SUMMARY

It is an object of the present invention to provide methods and apparatus for processing an IMS session originated by a UE, after restart of a S-CSCF that was previously assigned to a user of the UE during registration with the IMS, when a further S-CSCF is currently assigned to the user, wherein these methods do not require the support of the UE.

According to a first aspect, there is provided a method of processing an IMS session originated by a UE after restart of a S-CSCF that was previously assigned to a user of the UE during registration with the IMS, when a further S-CSCF is currently assigned to the user. The method comprises, at a HSS:

receiving a request to register a user identity of the user from the previously assigned S-CSCF;

determining that the previously assigned S-CSCF is not the same as a S-CSCF currently assigned to the user;

determining if IMS restoration procedures are supported for the UE, and, if IMS restoration procedures are not supported for the UE, sending a response to the previously assigned S-CSCF, the response identifying the further S-CSCF currently assigned to the user.

The step of receiving a request to register a user identity of the user may comprise receiving a Diameter protocol SAR message, the SAR message including an identifier of the previously assigned S-CSCF and having a Server Assignment Type indicating NO_ASSIGNMENT.

The step of sending a response to the previously assigned S-CSCF may comprise generating and sending a Diameter protocol SAA message, the SAA message having a Result Code indicating DIAMETER_IDENTITY_ALREADY_REGISTERED and including an identifier of the further S-CSCF currently assigned to the user.

According to a second aspect there is provided a method of processing an IMS session originated by a UE after restart of a S-CSCF that was previously assigned to a user of the UE during registration with the IMS, when a further S-CSCF is currently assigned to the user. The method comprises at the previously assigned S-CSCF:

upon receipt of a session establishment request for the session from a P-CSCF, generating and sending a request to register a user identity of the user to a HSS;

receiving a response from the HSS, the response identifying the further S-CSCF currently assigned to the user; and generating and sending a session establishment response to the P-CSCF, the session establishment response indicating that the session establishment request should be redirected to the further S-CSCF.

The session establishment response may comprise a SIP 305 Use Proxy message that specifies an identifier of the further S-CSCF to be used for redirection in a Contact header field.

The request to register a user identity of the user may comprise a Diameter protocol SAR message, the SAR message including an identifier of the previously assigned S-CSCF and having a Server Assignment Type indicating NO_ASSIGNMENT.

The response from the HSS may comprise a Diameter protocol SAA message, having a Result Code indicating DIAMETER_IDENTITY_ALREADY_REGISTERED and including an identifier of the further S-CSCF currently assigned to the user.

The method may further comprise including an indication as to whether the UE supports IMS restoration procedures in the request to register a user identity of the user. The method may then further comprise, upon receipt of the session establishment request for the session, determining if the UE is identified in a list of UEs that support IMS restoration procedures and, if not, including an indication that the UE does not support IMS restoration procedures in the request to register a user identity of the user.

The method may further comprise including in the session establishment response an indication that future requests received from the UE should be routed to the further S-CSCF.

According to a third aspect there is provided a method of processing an IMS session originated by a UE after restart of a S-CSCF that was previously assigned to a user of the UE during registration with the IMS, when a further S-CSCF is currently assigned to the user. The method comprises, at a P-CSCF:

upon receipt of a session establishment request for the session from the UE, sending the session establishment request to the previously assigned S-CSCF;

receiving a session establishment response from the previously assigned S-CSCF, the session establishment response specifying that the session establishment request should be redirected to the further S-CSCF and including an indication that future requests received from said UE should be routed to the further S-CSCF;

in accordance with the indication, updating a service route value that was stored during registration of the user with the IMS to replace the previously assigned S-CSCF with the further S-CSCF; and as specified in the session establishment response, resending the session establishment request to the further S-CSCF.

According to a fourth aspect there is provided an apparatus configured to operate as a HSS of an IMS. The apparatus comprises:

a receiver configured to receive a request to register a user identity of a user from a S-CSCF that was previously assigned to the user during registration with the IMS;

a processor configured to determine if the previously assigned S-CSCF is the same as a S-CSCF currently assigned to the user and, if the previously assigned S-CSCF is not the same as the S-CSCF currently assigned to the user, to determine if IMS restoration procedures are supported for the UE;

the processor being further configured to generate a response and, if it is determined that IMS restoration procedures are not supported for the UE, to include an identifier for the S-CSCF currently assigned to the user in the response; and a transmitter configured to send the response to the previously assigned S-CSCF.

The receiver may be configured to receive a request to register a user identity of the user that comprises a Diameter protocol SAR message, the SAR message including an identifier of the previously assigned S-CSCF and having a Server Assignment Type indicating NO_ASSIGNMENT.

The processor may be configured to generate a response that comprises a Diameter protocol SAA message, the SAA message having a Result Code indicating DIAMETER_IDENTITY_ALREADY_REGISTERED and including an identifier of the S-CSCF currently assigned to the user.

According to a fifth aspect there is provided an apparatus configured to operate as an S-CSCF of an IMS. The apparatus comprises:

a receiver configured to receive, from a P-CSCF, a session establishment request originated by a UE of a user;

a processor configured to determine if a user profile for the user of the UE should be retrieved and, if so, to generate a request to register a user identity of the user;

a transmitter configured to send the request to register a user identity of the user to a HSS;

the receiver being further configured to receive a response from the HSS that includes an identifier of a further S-CSCF that is currently assigned to the user;

the processor being further configured to generate a session establishment response indicating that the session establishment request should be redirected to the further S-CSCF; and the transmitter being further configured to send the session establishment response to the P-CSCF.

The processor may be configured to determine that a user profile for the user should be retrieved if data stored by the S-CSCF does not include a user profile for the user and if the data stored by the S-CSCF cannot be trusted.

The processor may be configured to generate a session establishment response that comprises a SIP 305 Use Proxy message that specifies an identifier of the further S-CSCF to be used for redirection in a Contact header field.

The processor may be configured to generate a request to register a user identity of the user that comprises a Diameter protocol SAR message, the SAR message including an identifier of the previously assigned S-CSCF and having a Server Assignment Type indicating NO_ASSIGNMENT.

The receiver may be configured to receive a response from the HSS that comprises a Diameter protocol SAA, having a Result Code indicating DIAMETER_IDENTITY_ALREADY_REGISTERED and including an identifier of the further S-CSCF currently assigned to the user.

The processor may be further configured to include an indication as to whether the UE supports IMS restoration procedures in the request to register a user identity of the user. The processor may be further configured to, upon receipt of the session establishment request, determine if the UE is identified in a list of UEs that support IMS restoration procedures and, if not, to include an indication that the UE does not support IMS restoration procedures in the request to register a user identity of the user.

The processor may be further configured to include in the session establishment response an indication that future requests received from the UE should be routed to the further S-CSCF.

According to a sixth aspect there is provided an apparatus configured to operate as a P-CSCF of an IMS. The apparatus comprises:
- a receiver configured to receive a session establishment request for the session from a UE of a user;
- a processor configured to determine an identity of a S-CSCF that was previously assigned to the user during registration with the IMS;
- a transmitter configured to send the session establishment request to the previously assigned S-CSCF;
- the receiver being further configured to receive a session establishment response from the previously assigned S-CSCF, the session establishment response specifying that the session establishment request should be redirected to a further S-CSCF that is currently assigned to the user and including an indication that future requests received from said UE should be routed to the further S-CSCF;
- the processor being further configured to update a service route value that was stored during registration of the user with the IMS to replace the previously assigned S-CSCF with the further S-CSCF, in accordance with the indication; and,
- the transmitter being further configured to resending the session establishment request to the further S-CSCF, as specified in the session establishment response.

BRIEF DESCRIPTION OF THE DRAWINGS

Aspects of the present invention will now be further described, by way of example only, with reference to the accompanying figures.

DETAILED DESCRIPTION

There will now be described methods and apparatus for processing an IMS session originated by a UE, after restart of a S-CSCF that was previously assigned to a user of the UE during registration with the IMS, when a further S-CSCF is currently assigned to the user, wherein these methods do not require the support of the UE.

In this regard, when the previously assigned S-CSCF receives a session establishment request for the session from a P-CSCF, the previously assigned S-CSCF generates and sends a request to register a user identity of the user to a HSS. When the HSS receives the request to register a user identity of the user from the previously assigned S-CSCF, the HSS will determine that the previously assigned S-CSCF is not the same as a S-CSCF currently assigned to the user. However, rather than simply responding to the previously assigned S-CSCF indicating that the request has been unsuccessful, in accordance with conventional IMS restoration procedures, the HSS determines if IMS restoration procedures are supported for the UE. If it is determined that IMS restoration procedures are not supported for the UE, then the HSS sends a response to the previously assigned S-CSCF that identifies the further S-CSCF currently assigned to the user. The previously assigned S-CSCF then sends a session establishment response to the P-CSCF, which indicates that the session establishment request should be redirected to the further S-CSCF. The P-CSCF then redirects the establishment request to the further S-CSCF currently assigned to the user.

These methods therefore provide for the successful recovery of an IMS session following a restart of a S-CSCF in circumstances in which the conventional IMS restoration procedures are not supported for the UE.

Figure 3:
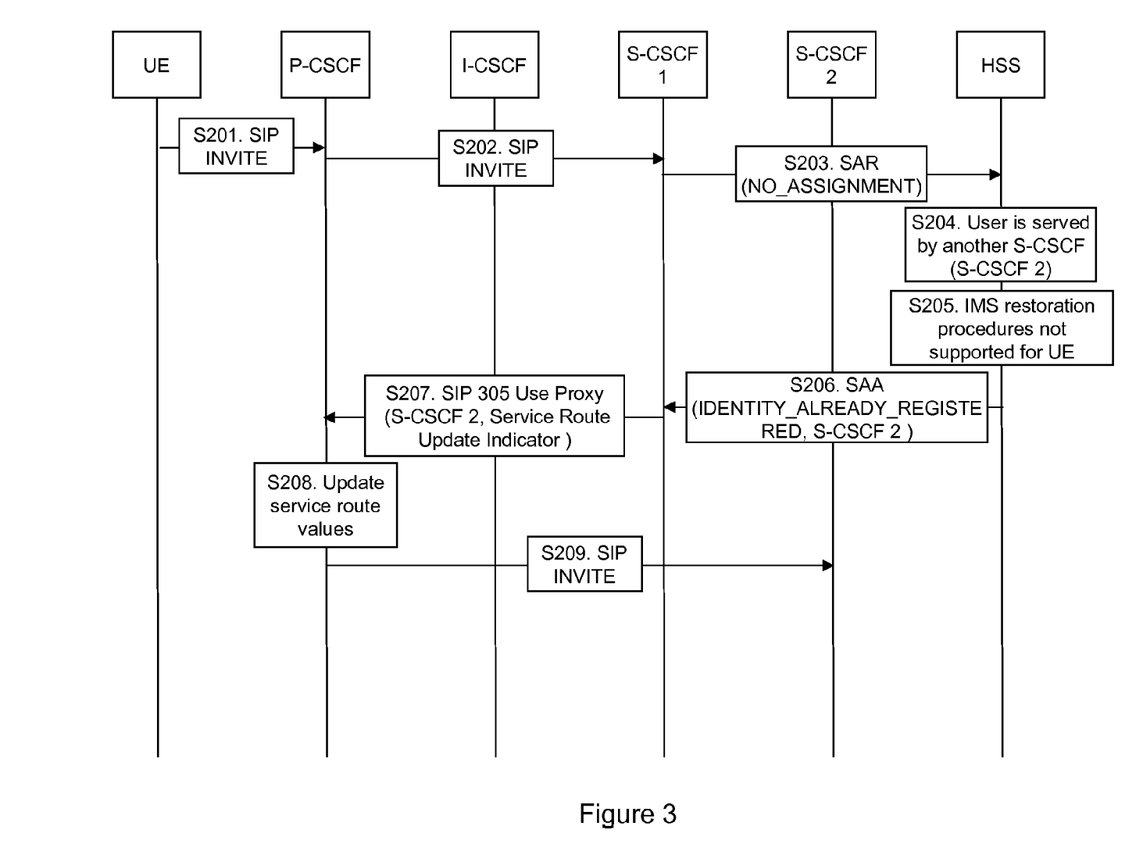
FIG. 3 is a signalling flow diagram illustrating an example of an implementation of the methods described herein.

FIG. 3 is a signalling flow diagram illustrating an example of an implementation of the methods described herein. The steps performed are as follows:

S201. The (originating) UE sends a SIP INVITE message to the P-CSCF that is serving the user in order to request establishment of an IMS session.

S202. The serving P-CSCF receives the SIP INVITE, and forwards the SIP INVITE message to S-CSCF 1, which was assigned to the UE during registration. In this regard, the P-CSCF will have learnt the identity of S-CSCF 1 from the Service-Route header fields received during the registration procedure.

S203. S-CSCF 1 receives the SIP INVITE. However, as S-CSCF 1 has lost all the user profile data or cannot trust the stored data, S-CSCF 1 attempts to obtain the user profile from the HSS. To do so, S-CSCF 1 sends a Diameter Server-Assignment-Request (SAR) message to the HSS, with the Server Assignment Type set to NO_ASSIGNMENT, in order to register a user identity of the user. Optionally the SAR message can also include information as to whether or not the UE of the user supports the restoration procedures specified in the current 3GPP specifications that have been described above.

S204. The HSS receives the SAR message, and checks whether the S-CSCF requesting the user profile is assigned for the user. In this scenario, the HSS determines S-CSCF 1 is no longer assigned to the user, as another S-CSCF (S-CSCF 2) has been subsequently been assigned to the user (i.e. as S-CSCF 2 has been assigned to the user as a result of a terminating session that occurred after the failure of S-CSCF 1).

S205. Consequently, the HSS determines if IMS restoration procedures are supported for the UE. For example, in order to make this determination, the HSS can make use of any explicit information that may have been included in the SAR message by the S-CSCF in this respect and/or can make use of locally stored data or data that is otherwise accessible to the HSS. In this example, the HSS determines that IMS restoration procedures are not supported for the UE.

S206. The HSS therefore responds to S-CSCF 1 indicating that the request has been unsuccessful because a further S-CSCF is currently assigned to the user. To do so, the HSS generates and sends a Diameter Server-Assignment-Answer (SAA) message to S-CSCF 1 with the Result- Code set to DIAMETER_IDENTITY_ALREADY_REGISTERED and including the identity of the further S-CSCF currently assigned to the user (i.e. S-CSCF 2).

S207. S-CSCF 1 receives the SAA message from the HSS and, as a result, generates and sends a response to the P-CSCF indicating that the SIP INVITE should be redirected to the currently assigned S-CSCF, S-CSCF 2. To do so, S-CSCF 1 uses a SIP 305 Use Proxy message that includes the identity of S-CSCF 2 that is to be used for redirection in the Contact header field. In addition, as the standards specify that a SIP 305 Use Proxy message requires that only a single SIP request (and not any future requests) is to be redirected), the S-CSCF 1 also includes an information element in the SIP 305 Use Proxy response sent to the P-CSCF that indicates that future service requests from this UE should also be routed to the currently assigned S-CSCF (i.e. S-CSCF 2, in the illustrated example). To do so, the S-CSCF 1 can include a Service Route Update Indicator, which indicates that the "service route" information held by the P-CSCF for the user (i.e. from the old registration) and which points out to the old S-CSCF (i.e. S-CSCF 1, in the illustrated example) should be updated according to the Contact header field received (i.e. overwritten with the new value received in the Contact header field), so that future requests received by the P-CSCF from the UE are routed to S-CSCF 2.

S208. The serving P-CSCF receives the SIP 305 Use Proxy message. The serving P-CSCF identifies the presence of the Service Route Indicator and, as a result, updates a list of service route values that were stored during registration of the UE with the IMS to replace the identity of S-CSCF 1 with the identity of S-CSCF 2 (as included in the Contact header field of the SIP 305 message). The serving P-CSCF then forwards the SIP INVITE (received in S202) to S-CSCF 2, such that the currently assigned S-CSCF can continue with the required processing of the session establishment request.

In the example illustrated in FIG. 3, the HSS determines that IMS restoration procedures are not supported for the UE. However, if the HSS determines that IMS restoration procedures are supported for the UE, then the HSS provides a conventional response to the previously assigned S-CSCF, such that the S-CSCF implements conventional IMS restoration procedures. In particular, the HSS would generate and send a response to the previously assigned S-CSCF that merely indicates that the request has been unsuccessful, without including any information regarding the currently assigned S-CSCF. To do so, the HSS would generate and send a Diameter SAA message with the Result-Code set to DIAMETER_UNABLE_TO_COMPLY, thereby indicating that the request has been unsuccessful for unspecified reasons.

According to the standards, a SIP 305 Use Proxy response to a request specifies that this single request (and not any future requests) should be redirected to the SIP URI give in the Contract header field. Consequently, the methods described herein provide that the S-CSCF can include a Service Route Update Indicator conveyed as a new information element in the SIP 305 Use Proxy response, which indicates that service route information held by a network element (e.g. P-CSCF) for the UE should be updated so that future requests associated with the UE of a user are routed to the S-CSCF identified in the Contact header field. The P-CSCF would then be configured to update a list of service route values that were stored during registration of the UE with the IMS, in accordance with the Service Route Indicator.

By way of example, the Service Route Indicator could be implemented using a SIP URI parameter that is included in the Contact header field of the IP 305 Use Proxy response with the SIP URI of the currently assigned S-CSCF. As an alternative example, the Service Route Indicator could be implemented using a cookie included in the user part of the SIP URI (e.g. "Contact: <sip:pcscf_orig%new_service_route@scscf2@ericsson.com;orig>").

As detailed above, the process of implemented by the HSS to determine whether the conventional IMS restoration procedures are supported, or not, for the UE can make use of any explicit information in this respect that may have been included by the previously assigned S-CSCF in the SAR message, and/or can make use of locally stored data of the HSS, or data that is otherwise accessible to the HSS, in respect of user identifiers that can be received in the SAR message. As detailed below, this data can be utilized by the HSS to identify the kind of UE that originated the session that caused the reception by the HSS of the SAR message (received in S203).

By way of example, the previously assigned S-CSCF could use information in the User-Agent header field of the SIP INVITE received from the UE to determine if the UE supports the conventional IMS restoration procedures. As an alternative example, the previously assigned S-CSCF could be provided with, or have access to, a database of user agent information that stores the capabilities of a plurality of UEs, and could perform a lookup in this database to determine if the UE supports the conventional IMS restoration procedures. The previously assigned S-CSCF could then include an indication as to whether the UE supports IMS restoration procedures in the request to register a user identity of the user that is sent to the HSS.

Alternatively, the previously assigned S-CSCF could include the User-Agent header field received in the SIP INVITE within the SAR message sent to the HSS. The HSS could then use the information in the User-Agent header field to determine if the UE supports the conventional IMS restoration procedures (i.e. by checking the value of the received User-Agent header field against information in a database stored at, or accessible by, the HSS). As a further alternative, the HSS could make use of the Private User Identity included in the SAR message to determine if the UE supports the conventional IMS restoration procedures (i.e. by checking the value of the received Private User Identity against capabilities information provided in a database stored at, or accessible by, the HSS). As a yet further alternative, the HSS could make use of the Public User Identity and/or the Private User Identity to obtain a terminal identifier (e.g. IMEI) of the UE, and also the version of the software governing the operation of said UE (i.e. the so called IMEI-Software Version, or IMEI-SV). The HSS could thereby determine the capabilities of the UE, and therefore whether or not the UE supports IMS restoration procedures.

Figure 4:
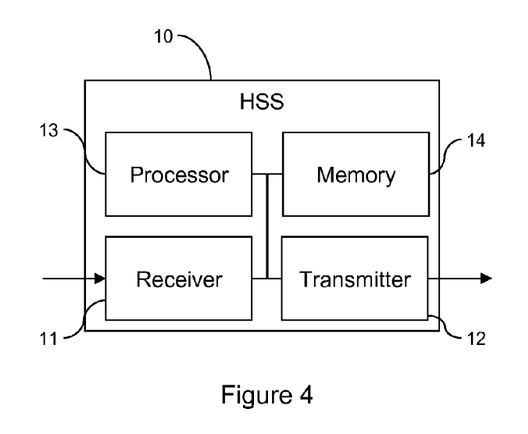
FIG. 4 illustrates schematically an example of a HSS suitable for implementing the methods described herein.

FIG. 4 illustrates schematically an example of a HSS 10 suitable for implementing the methods described herein. The HSS 10 can be implemented as a combination of computer hardware and software. The HSS 10 comprises a processor 11, a memory 12, a receiver 13 and a transmitter 14. The memory 12 stores the various programs/executable files that are implemented by the processor 11, and also provides a storage unit for any required data. For example, the data stored by the memory 12 can include but is not limited to user profile data for a plurality of users, together with information regarding the S-CSCF currently assigned to a registered user. The programs/executable files stored in the memory 12, and implemented by the processor 11, include but are not limited to an assigned S-CSCF determination unit, restoration support determination unit, and a response generation unit. For example, the assigned S-CSCF determination unit could be configured to determine if a S-CSCF is the same as a S-CSCF currently assigned to a user, the restoration support determination unit could be configured to determine if IMS restoration procedures are supported for a UE, and response generation unit could be configured to generate a response to a request to register a user identity of a user.

Figure 5:
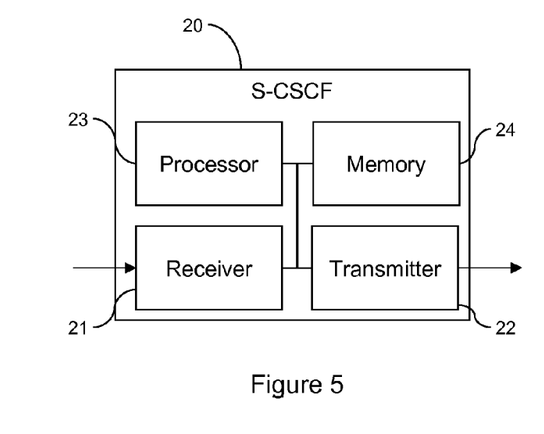
FIG. 5 illustrates schematically an example of a S-CSCF suitable for implementing the methods described herein.

FIG. 5 illustrates schematically an example of a S-CSCF 20 suitable for implementing the methods described herein. The S-CSCF 20 can be implemented as a combination of computer hardware and software. The S-CSCF 20 comprises a processor 21, a memory 22, a receiver 23 and a transmitter 24. The memory 22 stores the various programs/executable files that are implemented by the processor 21, and also provides a storage unit for any required data. For example, the data stored by the memory 12 can include but is not limited to user profile data for a plurality of users that has been obtained from a HSS, and capability information for a plurality of UEs that indicates whether or not the UE supports IMS restoration procedures. The programs/executable files stored in the memory 22, and implemented by the processor 21, include but are not limited to a user profile retrieval unit, a response generation unit, and a restoration support determination unit. For example, the user profile retrieval unit could be configured to determine if a user profile for a user should be retrieved and, if so, to generate a request to register a user identity of the user, the response generation unit could be configured to generate a session establishment response to a session establishment request, and the restoration support determination unit could be configured to determine whether or not IMS restoration procedures are supported for a UE of a user.

Figure 6:
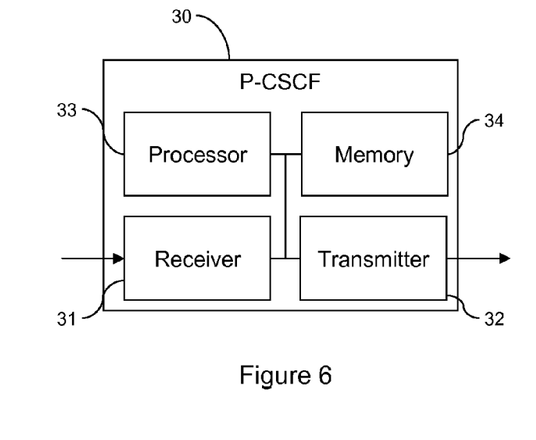
FIG. 6 illustrates schematically an example of a P-CSCF suitable for implementing the methods described herein.

FIG. 6 illustrates schematically an example of a P-CSCF 30 suitable for implementing the methods described herein. The P-CSCF 30 can be implemented as a combination of computer hardware and software. The P-CSCF 30 comprises a processor 31, a memory 32, a receiver 33 and a transmitter 34. The memory 32 stores the various programs/executable files that are implemented by the processor 31, and also provides a storage unit for any required data. For example, the data stored by the memory 32 can include but is not limited to a list of service route values for a served user that has registered with the IMS. The programs/executable files stored in the memory 32, and implemented by the processor 31, include but are not limited to a service routing unit. For example, the service routing unit could be configured to determine the identity of an S-CSCF that was previously assigned to a served user, to update the list of service route values stored for the served user, and to route a session establishment request associated with the user to an identified S-CSCF.

The methods described herein provide an alternative mechanism for implementing IMS restoration that does not require the support of the UE, and that does not cause the UE to suffer a service disruption.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration.

The invention claimed is:

1. A method of processing an IP Multimedia Subsystem (IMS) session originated by a User Equipment (UE) after restart of a Serving Call Session Control Function (S-CSCF) that was previously assigned to a user of the UE during registration with the IMS, when a further S-CSCF is currently assigned to the user, the method comprising, at a Home Subscriber Server (HSS):

receiving a request to register a user identity of the user from the previously assigned S-CSCF;

determining that the previously assigned S-CSCF is not the same as a S-CSCF currently assigned to the user;

determining if IMS restoration procedures are supported for the UE; and if IMS restoration procedures are not supported for the UE, sending a response to the previously assigned S-CSCF, the response identifying the further S-CSCF currently assigned to the user.

2. The method of claim 1, wherein receiving a request to register a user identity of the user comprises:

receiving a Diameter protocol Server-Assignment-Request (SAR) message, the SAR message including an identifier of the previously assigned S-CSCF and having a Server Assignment Type indicating NO_ASSIGNMENT.

3. The method of claim 1, wherein sending a response to the previously assigned S-CSCF comprises:

generating and sending a Diameter protocol Server-Assignment-Answer (SAA) message, the SAA message having a Result Code indicating DIAMETER_IDENTITY_ALREADY_REGISTERED and including an identifier of the further S-CSCF currently assigned to the user.

4. A method of processing an IP Multimedia Subsystem (IMS) session originated by a User Equipment (UE) after restart of a Serving Call Session Control Function (S-CSCF) that was previously assigned to a user of the UE during registration with the IMS, when a further S-CSCF is currently assigned to the user, the method comprising, at the previously assigned S-CSCF:

upon receipt of a session establishment request for the session from a Proxy Call Session Control Function (P-CSCF) generating and sending a request to register a user identity of the user to a Home Subscriber Server (HSS), the request to register the user identity of the user including an indication as to whether the UE supports IMS restoration procedures;

receiving a response from the HSS, the response identifying the further S-CSCF currently assigned to the user; and generating and sending a session establishment response to the P-CSCF, the session establishment response indicating that the session establishment request should be redirected to the further S-CSCF.

5. The method of claim 4, wherein the session establishment response comprises a Session Initiation Protocol (SIP)

Use Proxy message that specifies an identifier of the further S-CSCF to be used for redirection in a Contact header field.

6. The method of claim 4, wherein the request to register a user identity of the user comprises a Diameter protocol Server-Assignment-Request (SAR) message, the SAR message including an identifier of the previously assigned S-CSCF and having a Server Assignment Type indicating NO_ASSIGNMENT.

7. The method of claim 4, wherein the response from the HSS comprises a Diameter protocol Server-Assignment-Answer (SAA) having a Result Code indicating DIAMETER_IDENTITY_ALREADY_REGISTERED and including an identifier of the further S-CSCF currently assigned to the user.

8. The method of claim 4, further comprising:
upon receipt of the session establishment request for the session, determining if the UE is identified in a list of UEs that support IMS restoration procedures and, if not, including an indication that the UE does not support IMS restoration procedures in the request to register a user identity of the user.

9. The method as claimed of claim 4, further comprising:
including in the session establishment response an indication that future requests received from the UE should be routed to the further S-CSCF.

10. An apparatus configured to operate as a Home Subscriber Server (HSS) of an IP Multimedia Subsystem (IMS) the apparatus comprising:
a receiver configured to receive a request to register a user identity of a user from a Serving Call Session Control Function (S-CSCF) that was previously assigned to the user during registration with the IMS;
a processor configured to determine if the previously assigned S-CSCF is the same as a S-CSCF currently assigned to the user and, if the previously assigned S-CSCF is not the same as the S-CSCF currently assigned to the user, to determine if IMS restoration procedures are supported for the UE;
the processor being further configured to generate a response and, if it is determined that IMS restoration procedures are not supported for the UE, to include an identifier for the S-CSCF currently assigned to the user in the response; and
a transmitter configured to send the response to the previously assigned S-CSCF.

11. The apparatus of claim 10, wherein the receiver is configured to receive a request to register a user identity of the user that comprises a Diameter protocol Server-Assignment-Request (SAR) message, the SAR message including an identifier of the previously assigned S-CSCF and having a Server Assignment Type indicating NO_ASSIGNMENT.

12. The apparatus of claim 10, wherein the processor is configured to generate a response that comprises a Diameter protocol Server-Assignment-Answer (SAA) message, the SAA message having a Result Code indicating DIAMETER_IDENTITY_ALREADY_REGISTERED and including an identifier of the S-CSCF currently assigned to the user.

13. An apparatus configured to operate as an IP Multimedia Subsystem (IMS) Serving Call Session Control Function (S-CSCF) the apparatus comprising:
a receiver configured to receive, from a Proxy Call Session Control Function (P-CSCF) a session establishment request originated by a User Equipment (UE) of a user;
a processor configured to determine if a user profile for the user of the UE should be retrieved and, if so, to generate a request to register a user identity of the user, the request to register the user identify of the user including an indication as to whether the UE supports IMS restoration procedures;
a transmitter configured to send the request to register a user identity of the user to a Home Subscriber Server (HSS);
the receiver being further configured to receive a response from the HSS that includes an identifier of a further S-CSCF that is currently assigned to the user;
the processor being further configured to generate a session establishment response indicating that the session establishment request should be redirected to the further S-CSCF; and
the transmitter being further configured to send the session establishment response to the P-CSCF.

14. The apparatus of claim 13, wherein the processor is configured to determine that a user profile for the user should be retrieved if data stored by the S-CSCF does not include the user profile.

15. The apparatus of claim 13, wherein the processor is configured to generate a session establishment response that comprises a Session Initiation Protocol (SIP) Use Proxy message that specifies an identifier of the further S-CSCF to be used for redirection in a Contact header field.

16. The apparatus of claim 13, wherein the processor is configured to generate a request to register a user identity of the user that comprises a Diameter protocol Server-Assignment-Request (SAR) message, the SAR message including an identifier of the previously assigned S-CSCF and having a Server Assignment Type indicating NO_ASSIGNMENT.

17. The apparatus of claim 13, wherein the receiver is configured to receive a response from the HSS that comprises a Diameter protocol Server-Assignment-Answer (SAA) having a Result Code indicating DIAMETER_IDENTITY_ALREADY_REGISTERED and including an identifier of the further S-CSCF currently assigned to the user.

18. The apparatus of claim 13, wherein the processor is further configured to, upon receipt of the session establishment request, determine if the UE is identified in a list of UEs that support IMS restoration procedures and, if not, to include an indication that the UE does not support IMS restoration procedures in the request to register a user identity of the user.

19. The apparatus of claim 13, wherein the processor is further configured to include in the session establishment response an indication that future requests received from the UE should be routed to the further S-CSCF.

* * * * *